US012609099B1

(12) United States Patent
Chen et al.

(10) Patent No.: US 12,609,099 B1
(45) Date of Patent: Apr. 21, 2026

(54) ULTRASOUND MITIGATION IN WEARABLE DEVICES

(71) Applicant: Apple Inc., Cupertino, CA (US)

(72) Inventors: Hanchi Chen, Mountain View, CA (US); Jianjun He, San Jose, CA (US); Vladan Bajic, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 151 days.

(21) Appl. No.: 18/439,351

(22) Filed: Feb. 12, 2024

(51) Int. Cl.
*H04R 3/00* (2006.01)
*G10K 11/178* (2006.01)

(52) U.S. Cl.
CPC .. *G10K 11/17823* (2018.01); *G10K 11/17827* (2018.01); *G10K 11/17881* (2018.01); *G10K 11/17825* (2018.01); *G10K 2210/1081* (2013.01); *G10K 2210/3026* (2013.01); *G10K 2210/3027* (2013.01); *G10K 2210/3028* (2013.01); *G10K 2210/3046* (2013.01)

(58) Field of Classification Search
CPC ........................................................ H04R 3/00
See application file for complete search history.

(56) References Cited

U.S. PATENT DOCUMENTS 11,437,012 B2 9/2022 Chen et al.
2010/0034407 A1* 2/2010 Petrausch .............. H04R 25/45 381/318

OTHER PUBLICATIONS

Music Practice & Theory, "Question: Does the audio an instrument emits above 20 KHz affect how the instrument sounds?" received from https://music.stackexchange.com/questions/129234/does-the-audio-an-instrument-emits-above-20-khz-affect-how-the-instrument-sounds, Apr. 2023, 12 pages.

* cited by examiner

*Primary Examiner* — Ping Lee
(74) *Attorney, Agent, or Firm* — Aikin & Gallant, LLP

(57) ABSTRACT

A wearable device may include a microphone configured to generate a microphone signal, a speaker configured to be driven by an audio signal, and one or more processors configured to process the microphone signal to determine an amount of ultrasound in the microphone signal; determine, based on the amount of ultrasound, a parameter to control a digital filter that attenuates energy in the microphone signal, in which the digital filter attenuates more when the amount of ultrasound is increasing and less when the amount of ultrasound is decreasing; and apply the digital filter to the microphone signal to generate a reference audio signal that is then processed in a path that produces the audio signal to drive the speaker.

20 Claims, 7 Drawing Sheets

ULTRASOUND MITIGATION IN WEARABLE DEVICES

BACKGROUND

Field

This disclosure relates generally to wearable devices that include a speaker driven by an audio signal and, more specifically, to digital filtering in wearable devices to attenuate energy based on ultrasound. Other aspects are also described.

Background Information

Headphones and other wearable devices enable a wearer to listen to audio programs (e.g., playback content, such as music, podcasts, movie soundtracks, and phone calls) without disturbing others nearby. Different types of wearable devices may include over-ear, on-ear, loose fitting earbud, and sealing in-ear. Wearable devices may have varying amounts of passive sound isolation against ambient noise, depending on their materials and how closely they fit the wearer's head or ear. But in most instances, there is some leakage of ambient noise into the ear that can be heard by the wearer.

A technique known as acoustic noise cancellation or active noise control (ANC) mode can be used to drive a speaker of the wearable device to generate a sound field that is electronically designed to destructively interfere with the leaked ambient sound to create a quiet region at the wearers ear drum. Another technique referred to here as (active) transparency mode can be used to drive the speaker of the wearable device to reproduce the ambient sound. Transparency is useful in situations where passive sound isolation is particularly strong, yet the wearer prefers to hear their ambient environment (without having to remove the wearable device). This is also referred to as a hear-through function.

SUMMARY

Implementations of this disclosure include utilizing a digital filter to dynamically apply more filtering of a microphone signal when more ultrasound is present and less filtering of the microphone signal when less ultrasound is present. This may enable a reduction of the effects of ultrasound in an audio signal driving a speaker with reduced delay to the speaker. Some implementations may include a wearable device that includes a microphone configured to generate a microphone signal and a speaker configured to be driven by an audio signal. The wearable device may also include one or more processors configured to execute instructions stored in memory to process the microphone signal to determine an amount of ultrasound in the microphone signal; determine, based on the amount of ultrasound, a parameter to control a digital filter that attenuates energy in the microphone signal, in which the digital filter attenuates more when the amount of ultrasound is increasing and less when the amount of ultrasound is decreasing; and apply the digital filter to the microphone signal to generate a reference audio signal that is then processed in a path that produces the audio signal to drive the speaker. Other aspects are also described and claimed.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Figure 1:
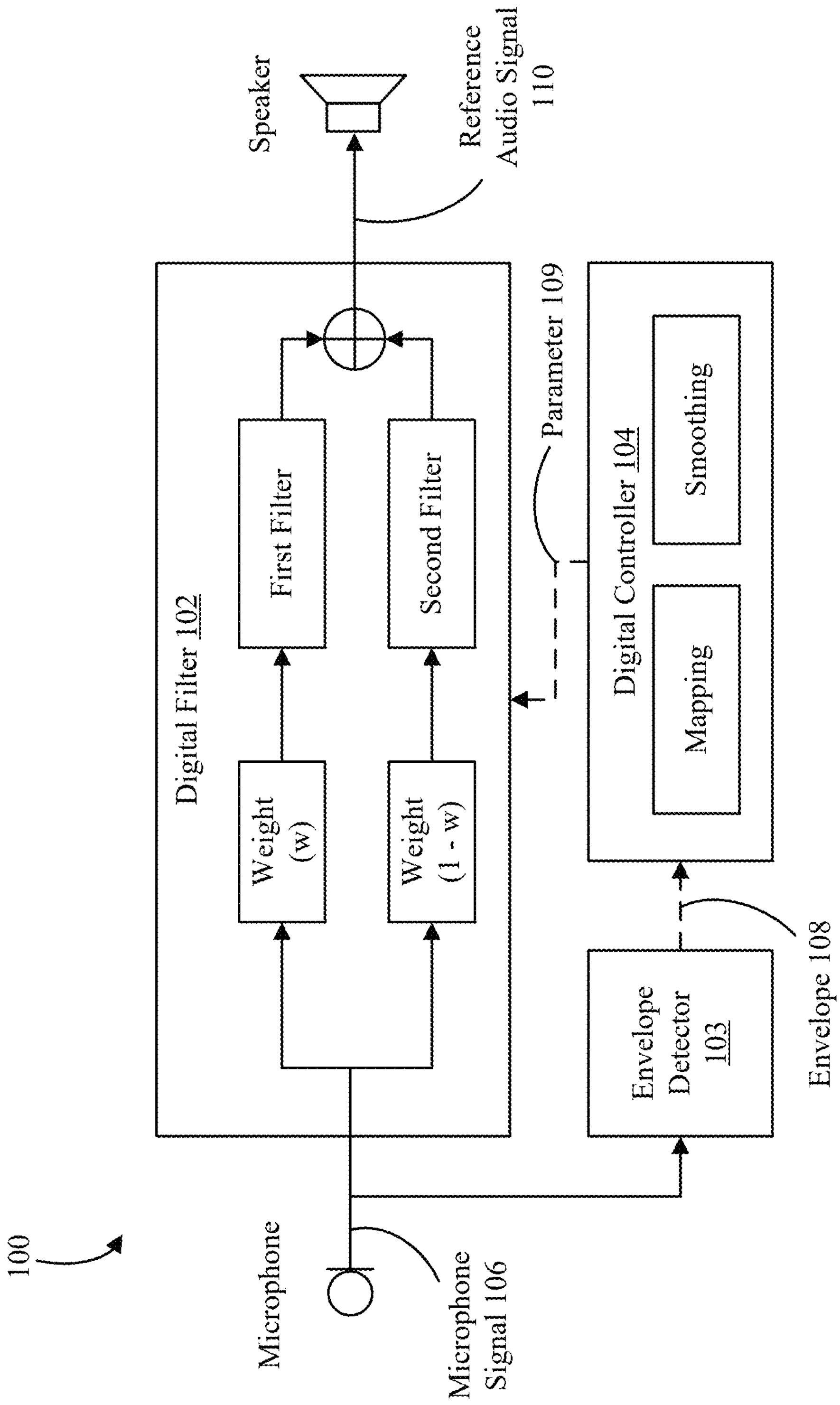
FIG. 1 is an example of an adaptive filter to attenuate energy based on ultrasound.

Ultrasound generally refers to sound with frequencies greater than 20 kilohertz (kHz). Ultrasound may represent an approximate upper audible limit of human hearing. Many sources of ultrasound exist in ambient environments. For example, motion sensors, occupancy sensors, and cleaning devices can each emit ultrasound.

In some cases, ultrasound may interfere with audio signals driving speakers in wearable devices worn by users. For example, when an amount of ultrasound is large in an environment, the ultrasound can overdrive and clip audio signals in an audible range that drive speakers in the wearable devices. The audio signals may include ANC, transparency, and/or playback signals. When such clipping occurs, the energy associated with the ultrasound may be spread across the frequency band (e.g., saturating the signal path) and become audible to the user. Further, ultrasound-induced energy may also cause distortion at specific frequencies in an audible range (e.g., spikes). This can also degrade the quality of audio delivered to the user.

While it may be possible to filter audio signals to reduce ultrasound, filtering can cause delay of audio signals in the path to the speaker. This, in turn, may negatively affect the performance of ANC and/or transparency modes. Further, clipping and/or distortion caused by ultrasound may be infrequent, and it may be undesirable to implement such static filtering all the time. It is therefore desirable to reduce the effects of ultrasound in audio signals when ultrasound is present, and in a path with minimal delay to the speaker.

Implementations of this disclosure address problems such as these by utilizing a digital filter to dynamically apply more filtering of a microphone signal when more ultrasound is present and less filtering of the microphone signal when less ultrasound is present (e.g., adaptive filtering). This may enable a reduction of the effects of ultrasound in an audio signal driving a speaker with reduced delay to the speaker. Some implementations may include a wearable device configured to be worn by a user (e.g., headphones, which may include over-ear, on-ear, loose fitting earbud, and sealing in-ear). The wearable device may include a microphone configured to generate a microphone signal, a speaker configured to be driven by an audio signal, and one or more processors configured to execute instructions stored in memory. The one or more processors may process the microphone signal to determine an amount of ultrasound in the microphone signal; determine, based on the amount of ultrasound, a parameter to control a digital filter that attenuates energy in the microphone signal, in which the digital filter attenuates more when the amount of ultrasound is increasing and less when the amount of ultrasound is decreasing; and apply the digital filter to the microphone signal to generate a reference audio signal that is then processed in a path that produces the audio signal to drive the speaker. As a result, the effects of ultrasound can be reduced without a constant increase of latency in the path.

In some implementations, a system may utilize a digital filter (e.g., a controllable shelf filter, low pass filter, notch filter, or peak filter, including variations thereof) to control the amount of ultrasound to optimize ANC and/or transparency signals in a pass band. For example, the system could adaptively configure the digital filter to implement a shelf filter (or high shelf filter) that passes all frequencies but reduces frequencies above the shelf frequency by specified amount (e.g., the ultrasound), and/or to implement a notch filter (or band-stop filter) that that passes most frequencies unaltered but attenuates those in a specific range to very low levels (e.g., ultrasound-induced distortion). By updating a strength (e.g., a weight or gain) of the filter, based on how strong ultrasound is in the environment, the system can prevent a microphone from being overdriven and adversely affecting ANC and/or transparency modes. The system can advantageously enable lower latency in an audio signal path. To prevent ultrasound from saturating the path, dynamic filtering may be utilized to remove the ultrasound, including without statically increasing latency in the path. The system may dynamically adjust the filtering based on the amount of ultrasound that is present. As a result, the system may enable at times a lower latency as compared to systems with a fixed filter.

In some implementations, the system can preserve low frequency (e.g., pass an audible range) and attenuate high frequency (e.g., ultrasound). In some implementations, the system can attenuate one or more target frequencies (e.g., ultrasound induced distortion in an audible range). In some implementations, the system can implement a fixed attenuation, and when ultrasound is low, the system can recover the attenuation with a positive gain filtering.

Thus, the system may enable zero attenuation with zero delay in the path that produces the audio signal when zero ultrasound is present (e.g., no penalty incurred). The system may also enable less attenuation with less delay in the path when less ultrasound is present (e.g., a lesser penalty incurred to mitigate ultrasound by reducing clipping and/or distortion). The system may also enable more attenuation with more delay in the path when more ultrasound is present (e.g., a greater penalty incurred to mitigate ultrasound, but limited to when greater ultrasound is present).

In some implementations, to ensure a smooth transition when ultrasound changes, the system can apply a dynamic smoothing so that the amount of attenuation does not strictly follow the amount of ultrasound. For example, when ultrasound reduces, the system can continue to hold the attenuation for a period longer (e.g., by a time constant). In some implementations, when there is low ultrasound (e.g., below a threshold), then decreasing ultrasound may not result in less attenuation (e.g., a minimum attenuation, or no attenuation, may already be applied). Similarly, when there is high ultrasound (e.g., above a threshold), then increasing ultrasound may not result in more attenuation (e.g., a maximum attenuation may already be applied).

In some implementations, the system can detect when a tonal distortion is caused by ultrasound (e.g., ultrasound-induced distortion), and apply a digital filter to suppress the tonal distortion at that tone. When a tonal distortion is caused by ultrasound, and ambient sound or playback sound does not mask the tone, the digital filter may be applied with a greater gain to suppress the tonal distortion. When ambient sound or playback sound does mask the tone, the digital filter may be applied with a lesser gain to suppress the tonal distortion, or not applied at all. For example, the digital filter may comprise one or more notch filters (and/or peak filters with a negative gain) to suppress the tonal distortion at the tone. The digital filter may suppress the tonal distortion based on an amount of ambient sound and/or playback sound associated with the tone. This may enable continued, effective use of ANC and/or transparency modes despite a presence of ultrasound, as opposed to muting them.

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

FIG. 1 is an example of an adaptive filter 100 to attenuate energy based on ultrasound. The adaptive filter 100 may include a digital filter 102, an envelope detector 103, and a digital controller 104. The adaptive filter 100 may be implemented by one or more processors implemented in a wearable device (e.g., headphones, which may include over-ear, on-ear, loose fitting earbud, and sealing in-ear). The wearable device may include a microphone configured to generate a microphone signal 106 and a speaker configured to be driven by an audio signal (e.g., based on the microphone signal 106). For example, the microphone signal 106 could be utilized in an ANC mode (e.g., to generate an ANC signal to destructively interfere with leaked ambient sound, to create a quiet region at the wearers ear drum via the speaker), a transparency mode (e.g., to generate a transparency signal to reproduce the ambient sound at the wearers ear drum via the speaker), and/or a playback mode (e.g., to generate a playback signal, such as music, podcasts, movie soundtracks, or a phone call). The audio signal to the speaker could include the ANC signal, the transparency signal, and/or the playback signal.

The one or more processors may process the microphone signal 106, via the envelope detector 103, to determine an amount of ultrasound in the microphone signal 106. For example, motion sensors, occupancy sensors, and cleaning devices can each emit ultrasound that interferes with the microphone signal 106. The one or more processors may determine an amount of ultrasound in the microphone signal 106 by determining an envelope 108 of ultrasound (indicated by a first broken line to distinguish from audio signal paths).

The one or more processors may then determine, via the digital controller 104, a parameter to control the digital filter 102 to attenuate energy in the microphone signal 106 (indicated by a parameter 109 corresponding to a second broken line). The parameter may enable, disable, and/or adjust ultrasound filtering performed by the digital filter 102. For example, the digital controller 104 can receive the envelope 108 and determine, based on the amount of ultrasound indicated by the envelope 108, the parameter for the digital filter 102. The parameter may comprise a weight used to control one or more filter controls of the digital filter 102. The filter controls may include, for example, a gain, cutoff frequency, quality factor, and/or roll off rate utilized by the filter. The digital controller 104 can determine the parameter based on mapping (e.g., a linear map of the envelope 108 to a weight) and/or smoothing (e.g., smoothing a transition between more attenuation and less attenuation based on a time constant). In some implementations, the parameter may specify a filter configuration (e.g., shelf filter, low pass filter, notch filter, or peak filter) to be implemented by the digital filter 102.

The digital controller 104 can then apply the parameter to the digital filter 102 (indicated by the parameter 109 corresponding to the second broken line) to attenuate energy in the microphone signal 106. Based on the parameter, the digital filter 102 can attenuate more energy when the amount of ultrasound is increasing and less energy when the amount of ultrasound is decreasing. The energy may be ultrasound energy (e.g., frequencies greater than 20 kHz, which may represent an approximate upper audible limit of human hearing), or ultrasound-induced energy (e.g., frequencies in an audible range, audible for human hearing) in the microphone signal 106. The digital filter 102 may attenuate such energy in the microphone signal 106 to prevent saturation of the audio signal that drives the speaker.

The one or more processors may apply the digital filter 102 to the microphone signal 106 to generate a reference audio signal 110. The reference audio signal 110 may be then processed in a path that produces the audio signal to drive the speaker (e.g., in a path that includes the ANC signal, the transparency signal, and/or the playback signal). As a result, the effects of ultrasound can be reduced in the reference audio signal 110, and the audio signal that drives the speaker, without a constant increase of latency in the path.

In some implementations, the digital filter 102 may be configured to crossfade between a first filter and a second filter based on the amount of ultrasound. A crossfade may refer to an audio technique used to smoothly transition between two signals. For example, the parameter may control a weight (W) applied to the first filter which may be a pass-through (e.g., which is no longer a "filter" in the strict sense of that word) and may oppositely control one minus the weight (1−W) applied to the second filter which may be a shelf filter, low pass filter, or variation thereof. The weight may be adjusted proportionally to the envelope 108. The first filter may generate a first output signal based on the weight (e.g., no attenuation of the microphone signal 106) and the second filter may generate a second output signal based on one minus the weight (e.g., attenuation of the microphone signal 106). The first output signal and the second output signal may then be combined to generate the reference audio signal 110. A change in the parameter, and correspondingly the weight, may cause a crossfade between the first filter and the second filter over time. As a result, when no ultrasound is present, the parameter may enable the reference audio signal 110 to be generated with zero delay (e.g., via the first filter, operating as a pass-through), effectively disabling the digital filter 102. When ultrasound is present, the parameter may enable the reference audio signal 110 to be generated with some delay (e.g., via the first filter and the second filter operating together), effectively filtering the ultrasound with delay limited by the amount of filtering to be performed. Thus, the digital filter 102 may dynamically enable, disable, and/or adjust ultrasound filtering based on an amount of ultrasound and/or ultrasound-induced distortion that may be present.

In some implementations, the digital filter 102 may include one or more digital biquad filters that may be controllable via parameters and filter controls. For example, the first filter of the digital filter 102 could be a first digital biquad filter and the second filter of the digital filter 102 could be a second digital biquad filter. The one or more digital biquad filters may implement various filtering as described herein, such as shelf filtering, low pass filtering, notch filtering, peak filtering (e.g., with a negative gain in an audible range), variations or combinations thereof, and/or no filtering. For example, the first filter could implement a first digital biquad filter that is selectively configured for no filtering at a particular time, and the second filter could implement a second digital biquad filter that is selectively configured as a shelf filter, low pass filter, notch filter, and/or a peak filter at the same time. As a result, the digital filter 102 can reduce the effects of ultrasound in the reference audio signal 110, including attenuating energy caused by ultrasound and/or ultrasound-induced distortion.

In some implementations, the digital controller 104 can apply smoothing in transitions between more attenuation and less attenuation of energy. Smoothing may enable an improved audio signal to be delivered to the wearer, such as by smoothing a transition based on a time constant. In operation, in response to detecting a decrease in an amount of ultrasound (e.g., in the microphone signal 106), the digital filter 102 can initially maintain an attenuation of the energy that is being applied for a period before decreasing or reducing the attenuation. Similarly, in response to detecting an increase in an amount of ultrasound, the digital filter 102 can initially maintain an attenuation of the energy that is being applied for a period before increasing the attenuation. By utilizing a time constant, abrupt changes in the audio signal may be avoided.

Referring further to FIG. 1, by way of example, when zero ultrasound is present, the digital controller 104 can configure the parameter to control the weight (W) to be 1, and one minus the weight (1−W) to be zero, to cause all of the microphone signal 106 to transmit through the first filter with zero delay (e.g., the pass-through), and none of the microphone signal 106 to transmit through the second filter (e.g., the shelf filter). This may result in no penalty incurred. When lesser ultrasound is present, the weight (W) may be controlled between one and zero, and one minus the weight (1−W) may be controlled between zero and one, to cause some of the microphone signal 106 to transmit through the first filter (e.g., the pass-through) and some of the microphone signal 106 to transmit through the second filter (e.g., the shelf filter). This may result in a lesser penalty incurred to mitigate ultrasound (e.g., lesser than a static filter). When greater ultrasound is present, the weight (W) may controlled to zero, and one minus the weight (1−W) may be controlled to one, to cause none of the microphone signal 106 to transmit through the first filter (e.g., the pass-through) and all of the microphone signal 106 to transmit through the second filter (e.g., the shelf filter). This may result in a greater penalty incurred to mitigate ultrasound, but with the penalty limited to when greater ultrasound is present.

Figure 2A:
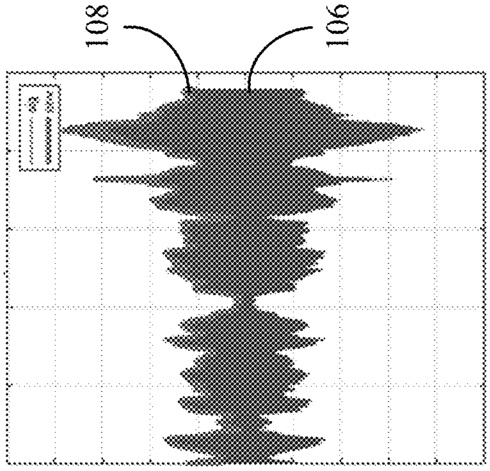
FIG. 2A is an example of a microphone signal and an envelope.
Figure 3A:
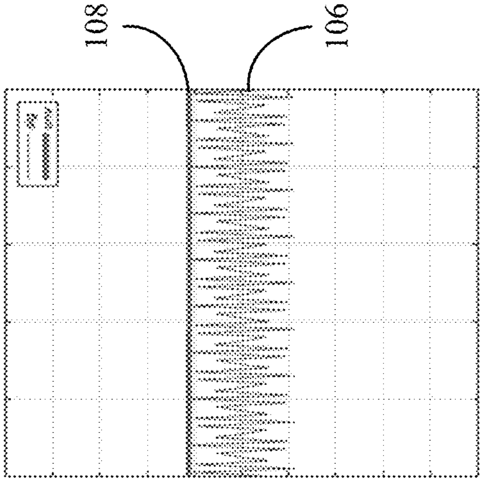
FIGS. 3A-3C are close-up examples of FIGS. 2A-2C, respectively.

With additional reference to FIG. 2A, the envelope 108 may be continuously determined with respect to the microphone signal 106 over a period. As may be seen in FIG. 3A, a close-up example of the envelope 108 and the microphone signal 106, the envelope 108 may represent a peak value of the microphone signal 106. The peak value may be caused by ultrasound-induced distortion in an audible range, and/or ultrasound beyond the audible range that causes clipping. In some implementations, the system may include a plurality of microphones that generate a plurality of microphone signals, and the envelope 108 may be an envelope of ultrasound for the plurality of microphone signals.

Figure 2B:
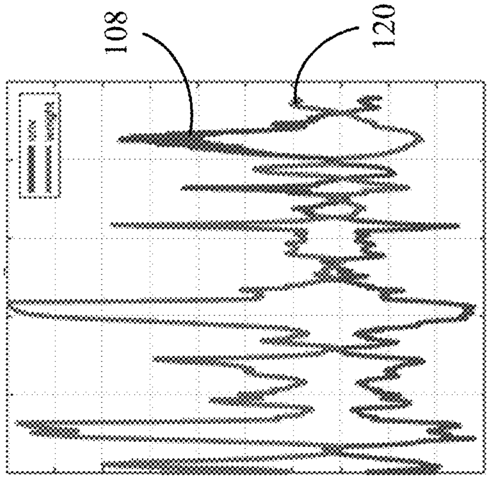
FIG. 2B is an example of varying a parameter controlling a digital filter based on the envelope.
Figure 2C:
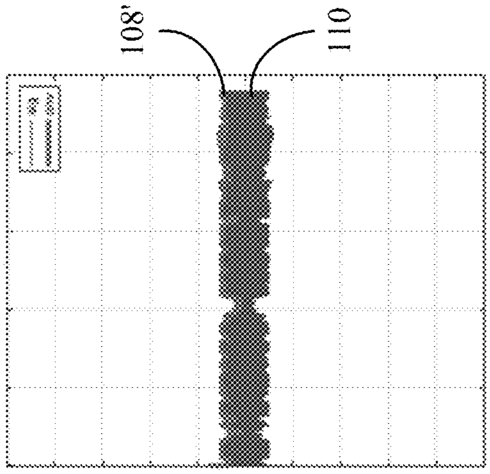
FIG. 2C is an example of a reference audio signal and an envelope following the digital filter.
Figure 3B:
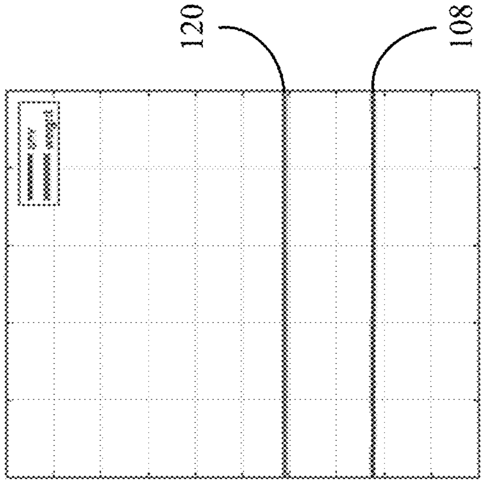
Figure 3C:
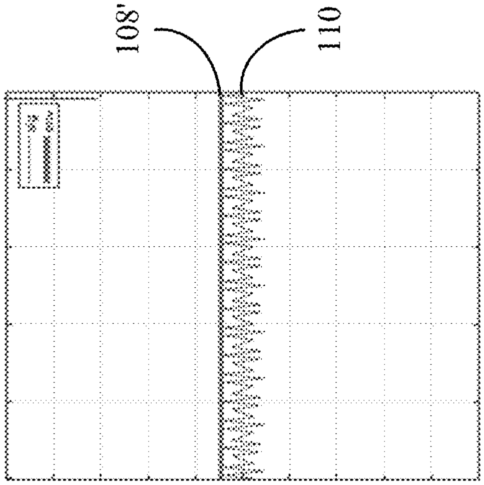

Referring to FIG. 2B, adaptive filtering performed by the adaptive filter 100 may enable the weight 120 (e.g., adaptively adjusted between zero and one), and correspondingly one minus the weight (e.g., adjusted between one and zero), to vary over a period based on variation of the envelope 108. As may be seen in FIG. 3B, a close-up example of the weight 120 and the envelope 108, the envelope 108 of a certain value may cause the weight 120 to have a certain value. As a result, with additional reference to FIG. 2C, the reference audio signal 110 (e.g., output from the digital filter 102) may be suppressed within an envelope 108' over a period. The envelope 108' may represent a reduction as compared to the envelope 108. As may be seen in FIG. 3C, a close-up example of the reference audio signal 110 and the envelope 108', the reference audio signal 110 may be contained with a peak value represented by the envelope 108'.

Figure 4:
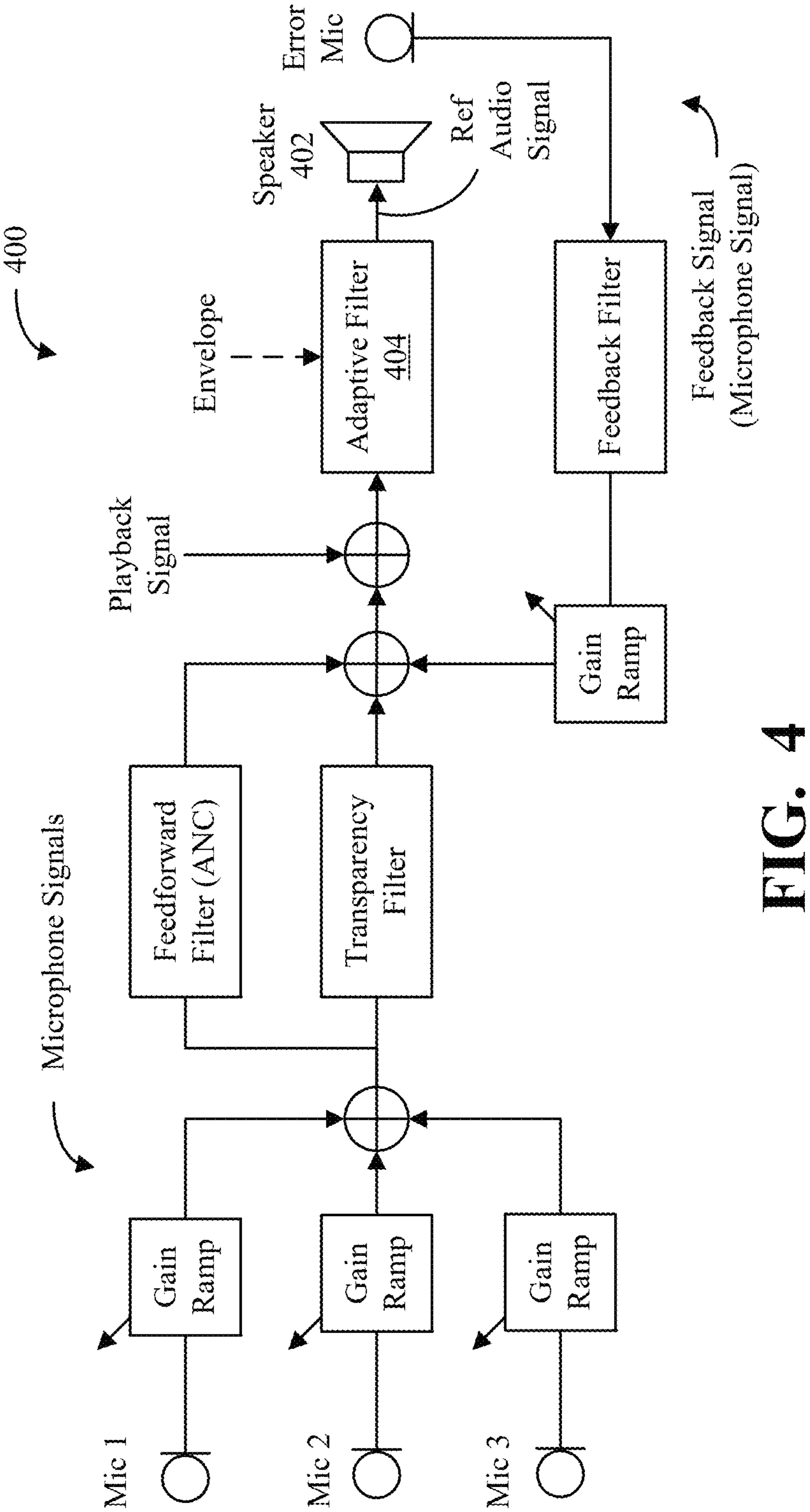
FIG. 4 is a block diagram of part of a system in which digital filtering, to attenuate energy based on ultrasound, is performed by a processor.

FIG. 4 is a block diagram of part of a system 400 in which digital filtering, to attenuate energy based on ultrasound, is performed by a processor. To reduce ambient noise (undesired sound) that may leak past a barrier, an ANC subsystem may be used. The ANC subsystem utilizes a processor to process one or more microphone signals (e.g., from external facing microphones, such as a microphone 1, microphone 2, and microphone 3, each following a gain ramp to generate a microphone signal like the microphone signal 106). The processor may process the microphone signals as part of an ANC algorithm that produces anti-noise by driving a speaker 402 (e.g., an earpiece speaker, driven via an audio signal) at the wearer's ear drum. For example, the ANC algorithm electronically designs the anti-noise to destructively interfere with or cancel any ambient noise that has leaked past an ear cup housing into the wearer's ear. In some instances, a feedback signal (e.g., another microphone signal) from an error microphone (e.g., am internal microphone, which may follow a feedback filter and a gain ramp to also generate a microphone signal, e.g., the feedback signal, like the microphone signal 106) may also be processed to improve the performance of the ANC subsystem. The microphone signals may be summed into a single, input signal that is input to a typical feedforward ANC filter (to produce anti-noise to drive the speaker 402) of the ANC subsystem.

The processor may also process the one or more microphone signals as part of an ambient sound enhancement subsystem, which reproduces the ambient sound (that is detected by the microphone signals), by driving the speaker 402. This is also referred to here as a transparency function or transparency subsystem which lets the wearer of the wearable device better hear their ambient environment (to thereby not be completely isolated from their ambient sound environment when wearing headphones.) The microphone signals, summed into the single, input signal, may be input to a feedforward transparency filter (to produce ambient sound to drive the speaker 402) of the transparency subsystem. Additionally, the feedback signal from the error microphone may be used to improve the user's experience during operation of the transparency function. For instance, the output of the feedback filter, which is operating upon an audio signal from the error microphone, may be added, as shown in FIG. 4, to drive the speaker 402 in a way that reduces the undesirable occlusion effect experienced by the wearer, especially in cases where the wearable device is a closed back design or that otherwise has a tendency to acoustically seal the ear (against the ambient environment).

Outputs of the feedforward ANC filter (e.g., an ANC signal), the feedforward transparency filter (e.g., a transparency signal), the feedback filter (e.g., a feedback signal), and/or a playback sound (e.g., a playback signal, such as music, a podcast, a movie soundtrack, or a phone call) may be provided to an adaptive filter 404 as an input signal. For example, the adaptive filter 404 could be the adaptive filter 100 of FIG. 1. The adaptive filter 404 may determine an envelope of ultrasound in the input signal (indicated by a broken line to distinguish from audio signal paths) to perform adaptive filtering of the input signal to generate a reference audio signal in path that produces the audio signal to drive the speaker 402. This may enable a reduction of the effects of ultrasound in the audio signal, whether associated with ANC, transparency, feedback, or playback, with reduced delay to the speaker 402. In some implementations, the adaptive filter 404 may be arranged before the feedforward ANC filter, the feedforward transparency filter, the feedback filter, and/or the playback (e.g., upstream in the system 400, to then generate the ANC signal, the transparency signal, the feedback signal, and/or the playback signal with a reduction of the effects of ultrasound), as opposed to after the feedforward ANC filter, the feedforward transparency filter, the feedback filter, and the playback as shown. For example, the adaptive filter 404 could receive the microphone signals, summed into the single, input signal, then generate the reference audio signal in a path to the feedforward ANC filter, the feedforward transparency filter, and/or the feedback filter.

Figure 5:
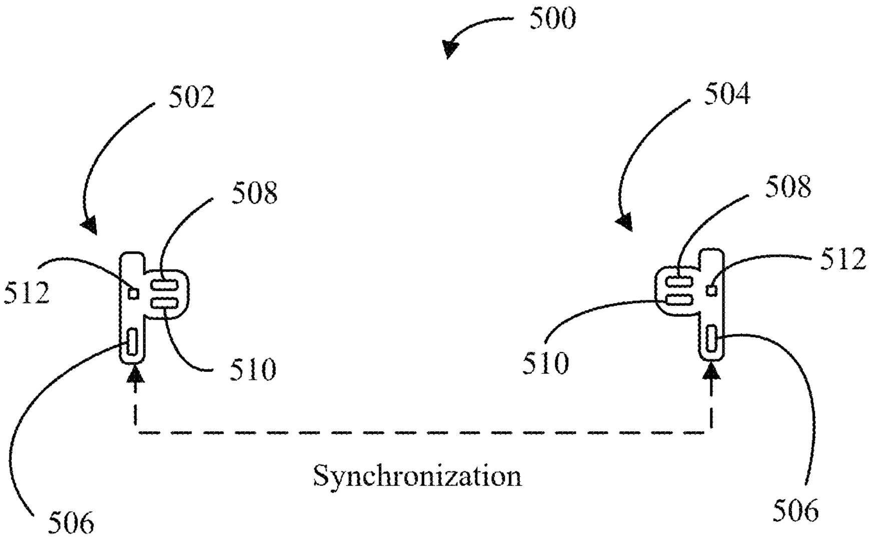
FIG. 5 is an example of a wearable device synchronizing a parameter to control digital filtering.

FIG. 5 is an example of a wearable device 500 synchronizing a parameter to control digital filtering. The wearable device 500 may implement the adaptive filter 100 of FIG. 1 and/or the system 400 of FIG. 4. For example, the wearable device 500 may include a first earbud 502 (e.g., a left earbud) and a second earbud 504 (e.g., a right earbud). Each earbud may implement one or more microphones configured to generate a microphone signal, such as an external microphone 506 (e.g., a reference microphone) and an internal microphone 508 (e.g., an error microphone). Each earbud may also include a speaker 510 configured to be driven by an audio signal and one or more processors 512 configured to execute instructions stored in memory.

In each earbud, the one or more processors 512 may process a microphone signal (e.g., generated by the external microphone 506 and/or the internal microphone 508) to determine an amount of ultrasound in the microphone signal. The one or more processors 512 may then determine, based on the amount of ultrasound, a parameter to control a digital filter (e.g., the digital filter 102) that attenuates energy in the microphone signal. The first earbud 502 and the second earbud 504 may synchronize the parameter with one another to control the digital filter similarly in each earbud. In some cases, the parameter may represent an average amount of ultrasound determined between the first earbud 502 and the second earbud 504. In some cases, the parameter may represent a worst case amount of ultrasound determined by either the first earbud 502 or the second earbud 504. The parameter may be synchronized via wireless communication between the first earbud 502 and the second earbud 504. Once synchronized, the parameter may be applied in each earbud to correspondingly control a digital filter, including to attenuate more energy when the amount of ultrasound is increasing and less energy when the amount of ultrasound is decreasing.

Figure 6:
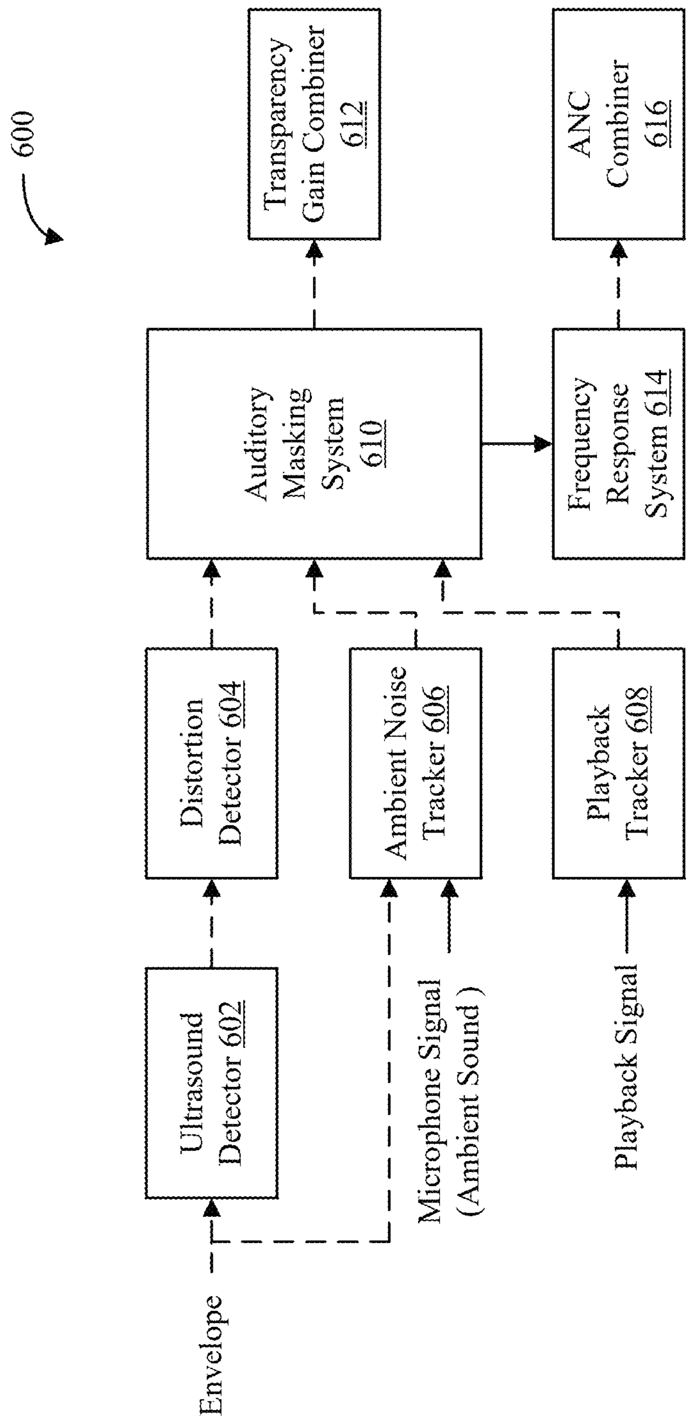
FIG. 6 is an example of an adaptive filter for suppressing ultrasound induced distortion.

FIG. 6 is an example of an adaptive filter 600 for suppressing ultrasound induced distortion. For example, a wearable device (e.g., the wearable device 500) could implement the adaptive filter 600, including in combination with the adaptive filter 100 of FIG. 1. The adaptive filter 600 may receive inputs, including a microphone signal (e.g., the microphone signal 106 of FIG. 1, or a microphone signal of FIG. 4), an envelope (e.g., like the envelope 108, indicated by a broken line to distinguish from audio signal paths), and/or a playback signal (e.g., the playback signal of FIG. 4). The envelope may represent a computation of strength of ultrasound in the microphone signal. An ultrasound detector 602 can receive the envelope and utilize thresholding to determine an extent to which adaptive filtering may apply. For example, if a source of ultrasound is distant from a wearable device (e.g., several meters away or more), there may be minimal ultrasound-induced distortion in the audible range. As a result, thresholding of the ultrasound detector 602 may prevent filtering, thereby allowing the least delay in the audio signal path. However, if the source of ultrasound is closer to the wearable device (e.g., within a meter), there may be noticeable ultrasound-induced distortion in the audible range (e.g., tonal distortions). As a result, thresholding of the ultrasound detector 602 may enable filtering, and further processing by a distortion detector 604 to determine tonal distortions induced by the ultrasound.

The adaptive filter 600 may also determine whether ultrasound is being masked by ambient sound and/or playback sound. An ambient noise tracker 606 may compare an amount of ultrasound to an ambient signal to determine an amount in which ambient sound may be masking ultrasound induced distortion in the audible range. Also, a playback tracker 608 may analyze the playback signal to determine an amount in which the playback sound may be masking ultrasound induced distortion in the audible range. The ambient noise tracker 606 and the playback tracker 608 may generate outputs (e.g., calculated ratios at one or more frequencies, indicated by broken lines) for an auditory masking system 610. The auditory masking system 610 can utilize a model to compute one or more filter controls of a digital filter (e.g., the digital filter 102) for suppressing tonal distortion caused by ultrasound based on the outputs from the ambient noise tracker 606 and the playback tracker. This may enable controlling the digital filter based on the amount of ultrasound. For example, the auditory masking system 610 may determine dynamic gains for one or more notch filters and/or peak filters (with negative gains) in an audible range to attenuate ultrasound-induced energy, such as ultrasound-induced distortion. In some cases, multiple filters having different filter controls may be applied with respect to multiple frequencies. For transparency mode, the auditory masking system 610 may output one or more gains (indicated by a broken line) to a transparency gain combiner 612 to implement dynamic gain filtering for a digital filter in the transparency signal. For ANC mode, the auditory masking system 610 may output to a frequency response system 614 which may calculate one or more frequency responses for outputting to an ANC combiner 616 to implement dynamic gain filtering for a digital filter in the ANC signal (indicated by broken lines). As a result, the adaptive filter 600 may enable adaptive suppression of tonal distortions by computing levels of the ambient sound and the playback sound and correspondingly adjusting the filter controls of one or more digital filters (e.g., gains of one or more notch filters).

Figure 7:
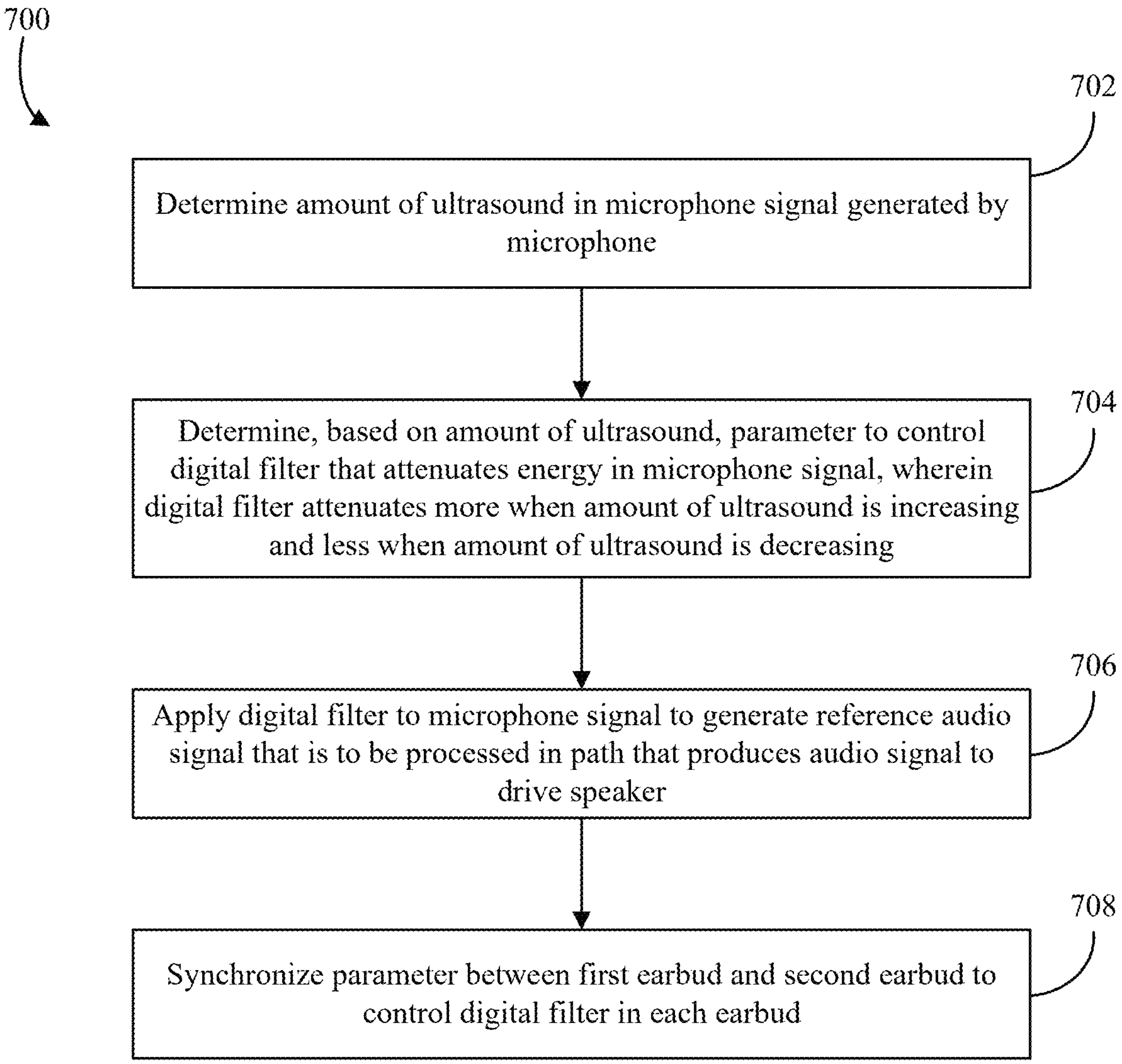
FIG. 7 is a flowchart of an example of a process for digital filtering to attenuate energy based on ultrasound.

FIG. 7 is a flowchart of an example of a process 700 for digital filtering to attenuate energy based on ultrasound. The process 700 can be executed using computing devices, such as the systems, hardware, and software described with respect to FIGS. 1-6. The process 700 can be performed, for example, by executing a machine-readable program or other computer-executable instructions, such as routines, instructions, programs, or other code. The steps, or operations, of the process 700 or another process, method, technique, or algorithm described in connection with the implementations disclosed herein can be implemented directly in hardware, firmware, software executed by hardware, circuitry, or a combination thereof.

For simplicity of explanation, the process 700 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a process in accordance with the disclosed subject matter.

At operation 702, a system may determine an amount of ultrasound in a microphone signal generated by a microphone. For example, for the adaptive filter 100, the one or more processors may determine an amount of ultrasound in the microphone signal 106. This may include determining an envelope (e.g., the envelope 108), which may be an envelope for multiple microphone signals.

At operation 704, the system may determine, based on the amount of ultrasound, a parameter to control a digital filter that attenuates energy in the microphone signal. The digital filter may attenuate more when the amount of ultrasound is increasing and less when the amount of ultrasound is decreasing. For example, for the adaptive filter 100, the one or more processors may determine, based on the amount of ultrasound, a parameter to control the digital filter 102 to attenuate energy in the microphone signal 106.

At operation 706, the system may dynamically apply the digital filter to the microphone signal to generate a reference audio signal that is to be processed in a path that produces an audio signal to drive a speaker. For example, for the adaptive filter 100, the one or more processors may apply the digital filter 102 to the microphone signal 106 to generate a reference audio signal 110. In some implementations, the reference audio signal may be generated by combining a first output signal from a first filter with a second output signal from a second filter and combining the outputs. The first filter and the second filter could each be digital biquad filters. The first filter could be a pass-through, and the second filter could be a shelf filter, low pass filter, notch filter, or peak filter. Dynamically applying the digital filter may cause the digital filter to attenuate more energy in the microphone signal when the amount of ultrasound is increasing and attenuate less energy in the microphone signal when the amount of ultrasound is decreasing. Dynamically applying the digital filter may include crossfading between the first filter and the second digital filter. The system may then drive the speaker using the reference audio signal.

At operation 708, in some cases, the system may synchronize a first earbud and a second earbud to control a digital filter in each earbud. For example, for the wearable device 500, the first earbud 502 and the second earbud 504 may synchronize a parameter with one another to control a digital filter 102 implemented in each earbud. The parameter may represent an average amount of ultrasound determined between the first earbud and the second earbud, or a worst case amount of ultrasound determined by either the first earbud or the second earbud.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

In utilizing the various aspects of the embodiments, it would become apparent to one skilled in the art that combinations or variations of the above embodiments are possible for digital filtering to attenuate energy based on ultrasound. Although the embodiments have been described in language specific to structural features and/or methodological acts, it is to be understood that the appended claims are not necessarily limited to the specific features or acts described. The specific features and acts disclosed are instead to be understood as embodiments of the claims useful for illustration.

What is claimed is:

1. A wearable device, comprising:

a microphone configured to generate a microphone signal;

a speaker configured to be driven by an audio signal; and one or more processors configured to:

- determine an amount of ultrasound in the microphone signal;
- dynamically apply a digital filter to the microphone signal to generate a reference audio signal, wherein the digital filter attenuates more energy in the microphone signal when the amount of ultrasound is increasing and attenuates less energy in the microphone signal when the amount of ultrasound is decreasing; and
- drive the speaker using the reference audio signal, wherein a path to the speaker includes at least one of a feedforward filter of an acoustic noise cancellation (ANC) subsystem or a transparency filter of a transparency subsystem.

2. The wearable device of claim 1, wherein the digital filter attenuates ultrasound energy, or ultrasound-induced energy in an audible range, in the microphone signal to prevent saturation of the audio signal.

3. The wearable device of claim 1, wherein the reference audio signal is generated with less delay when less ultrasound is present.

4. The wearable device of claim 1, wherein a parameter disables the digital filter, and wherein the reference audio signal is generated with zero delay when no ultrasound is present.

5. The wearable device of claim 1, wherein a parameter indicates a weight that controls one or more filter controls of the digital filter.

6. The wearable device of claim 1, wherein the digital filter is configured to crossfade between a first filter and a second filter based on the amount of ultrasound.

7. The wearable device of claim 1, wherein the digital filter is configured to generate the reference audio signal by combining a first output signal from a first filter with a second output signal from a second filter.

8. The wearable device of claim 1, wherein the digital filter comprises a digital biquad filter configured to implement shelf filter.

9. The wearable device of claim 1, wherein the digital filter comprises a digital biquad filter configured to implement low pass filter.

10. The wearable device of claim 1, wherein the digital filter comprises a digital biquad filter configured to implement one or more notch filters or peak filters with a negative gain in an audible range.

11. The wearable device of claim 1, wherein the digital filter is configured to attenuate ultrasound-induced distortion in an audible range.

12. The wearable device of claim 1, wherein the microphone, the speaker, and the one or more processors are implemented in a first earbud, and further comprising:

- a second earbud in communication with the first earbud, wherein the first earbud and the second earbud synchronize with one another to control the digital filter in each earbud.

13. The wearable device of claim 1, wherein the microphone is one of a plurality of microphones that generate a plurality of microphone signals, and the one or more processors determine the amount of ultrasound by determining an envelope of ultrasound for the plurality of microphone signals.

14. The wearable device of claim 1, wherein, in response to detecting a decrease in the amount of ultrasound, the digital filter initially maintains an attenuation for a period before reducing the attenuation.

15. The wearable device of claim 1, wherein the one or more processors are further configured to:

- smooth a transition between more attenuation and less attenuation based on a time constant.

16. The wearable device of claim 1, wherein the one or more processors are further configured to:

- determine an amount in which a playback signal is masking ultrasound induced distortion in an audible range and controlling the digital filter based on the amount.

17. The wearable device of claim 1, wherein the one or more processors are further configured to:

- determine an amount in which ambient sound is masking ultrasound induced distortion in an audible range and controlling the digital filter based on the amount.

18. The wearable device of claim 1, wherein the digital filter dynamically enables or disables ultrasound filtering based on the amount of ultrasound.

19. The wearable device of claim 1, wherein the microphone signal is processed in an ANC mode to generate an ANC signal to destructively interfere with leaked ambient sound.

20. A method, comprising:

- determining an amount of ultrasound in a microphone signal;
- dynamically applying a digital filter to the microphone signal to generate a reference audio signal, wherein the digital filter attenuates more energy in the microphone signal when the amount of ultrasound is increasing and attenuates less energy in the microphone signal when the amount of ultrasound is decreasing; and
- driving a speaker using the reference audio signal, wherein a path to the speaker includes at least one of a feedforward filter of an acoustic noise cancellation (ANC) subsystem or a transparency filter of a transparency subsystem.

* * * * *